US011802091B2

(12) United States Patent
Cho

(10) Patent No.: US 11,802,091 B2
(45) Date of Patent: Oct. 31, 2023

(54) SEALABLE DEVICES TO CAUSE DEPOSITION OF VAPORS INTO SAMPLES

(71) Applicant: The Government of the United States of America, as represented by the Secretary of Homeland Security, Washington, DC (US)

(72) Inventor: Inho Cho, Egg Harbor Township, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/971,018

(22) Filed: Oct. 21, 2022

(65) Prior Publication Data

US 2023/0039282 A1    Feb. 9, 2023

Related U.S. Application Data

(63) Continuation of application No. 16/369,371, filed on Mar. 29, 2019, now Pat. No. 11,498,882.

(51) Int. Cl.
*C04B 41/45* (2006.01)
*C04B 41/00* (2006.01)
(Continued)

(52) U.S. Cl.
CPC ........... *C04B 41/4531* (2013.01); *B01J 15/00* (2013.01); *B01J 19/0073* (2013.01);
(Continued)

(58) Field of Classification Search
CPC ........ B01J 15/00; B01J 19/00; B01J 19/0053; B01J 19/0073; B01J 2219/00;
(Continued)

(56) References Cited

U.S. PATENT DOCUMENTS 1,784,164 A    12/1930    Stoffels et al.
5,217,755 A    6/1993    Thebault et al.
(Continued)

FOREIGN PATENT DOCUMENTS

JP    2018172794 A  *  11/2018
WO    2014181118 A1    11/2014
WO    2019198926 A1    10/2019

OTHER PUBLICATIONS

Machine translation of JP 2018-172794 A, which was published on Nov. 8, 2018 (Year: 2018).*

(Continued)

*Primary Examiner* — Natasha E Young
(74) *Attorney, Agent, or Firm* — Lavanya Ratnam; Robert W. Busby; William Washington

(57) ABSTRACT

Various embodiments of the present invention are directed towards a system and method relating to depositing vapor in a sample. For example, a device includes a vapor source chamber configured to contain a vapor source material to generate vapor. An activation chamber is configured to contain a sample. The activation chamber is in fluid communication with the vapor source chamber to receive the vapor. A permeable separator divides the vapor source chamber and the activation chamber, and isolates the sample in the activation chamber while allowing vapor to pass between the vapor source chamber and the activation chamber. The device is sealable and configured to apply vacuum to the vapor and sample, to cause deposition of the vapor into the pumice stone samples.

15 Claims, 4 Drawing Sheets

Figure 1:
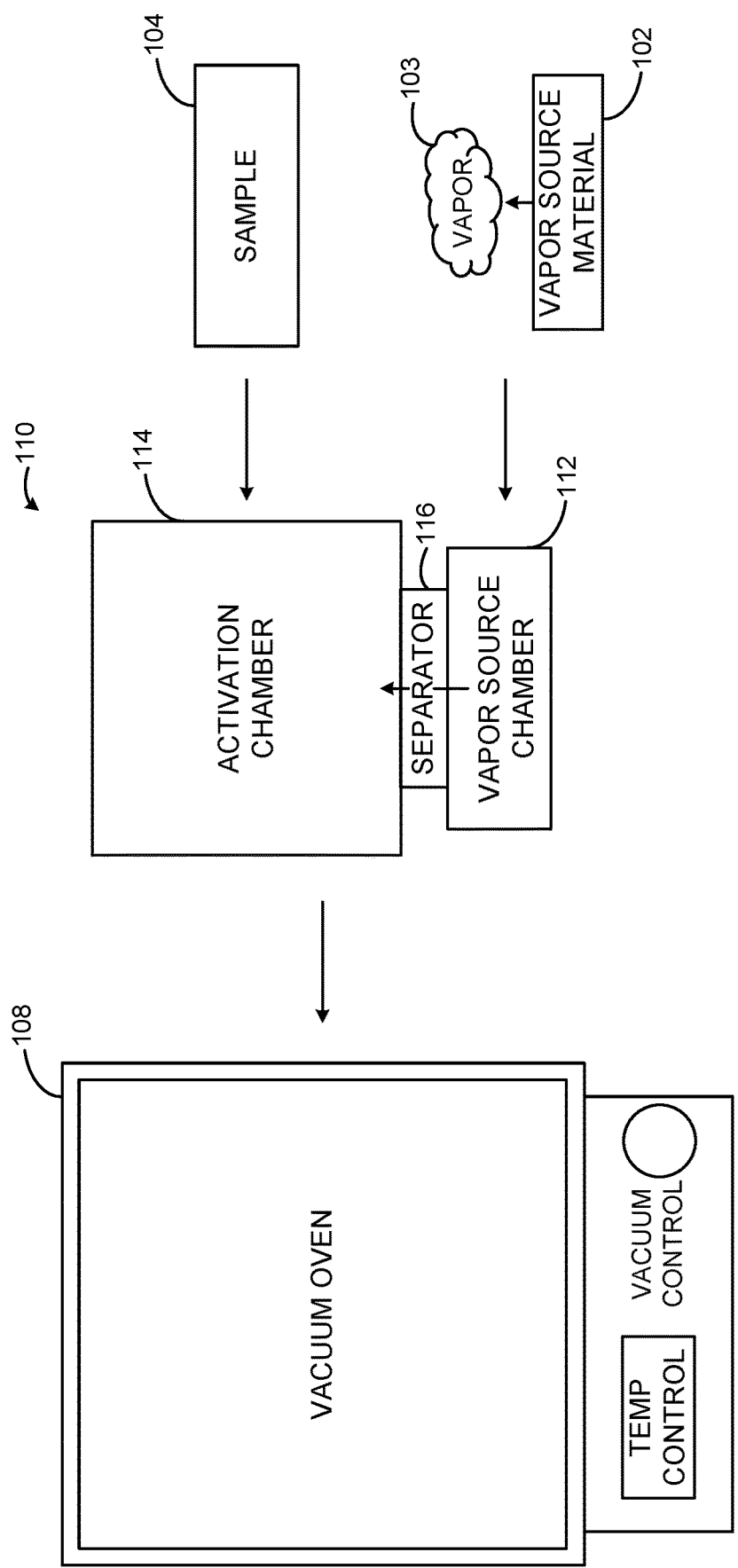

(51) Int. Cl.
*C04B 41/62* (2006.01)
*B01J 19/00* (2006.01)
*B01J 15/00* (2006.01)
*C04B 111/54* (2006.01)

(52) U.S. Cl.
CPC .......... *C04B 41/009* (2013.01); *C04B 41/455* (2013.01); *C04B 41/62* (2013.01); *B01J 2219/00051* (2013.01); *B01J 2219/00162* (2013.01); *C04B 2111/542* (2013.01)

(58) Field of Classification Search
CPC .... B01J 2219/00079; B01J 2219/00051; B01J 2219/00162; C04B 41/00; C04B 41/009; C04B 41/45; C04B 41/4505; C04B 41/4529; C04B 41/4531; C04B 41/455; C04B 41/60; C04B 41/61; C04B 41/62; C04B 2111/00; C04B 2111/54; C04B 2111/542
See application file for complete search history.

(56) References Cited

U.S. PATENT DOCUMENTS

| | | | |
|---|---|---|---|
| 5,702,780 A | 12/1997 | Tiller et al. | |
| 7,051,681 B2 | 5/2006 | Pope | |
| 7,694,628 B2 | 4/2010 | Adebimpe et al. | |
| 8,091,508 B2 | 1/2012 | Laplant et al. | |
| 8,444,881 B2 | 5/2013 | Adebimpe | |
| 8,955,528 B1 * | 2/2015 | Escobar | A61K 8/31 132/308 |
| 9,897,419 B1 | 2/2018 | Reynolds et al. | |
| 10,274,469 B2 | 4/2019 | Brasfield | |
| 10,365,075 B2 | 7/2019 | Apblett et al. | |
| 2007/0266771 A1 | 11/2007 | Goldson et al. | |
| 2020/0054777 A1 | 2/2020 | Burns et al. | |
| 2020/0296932 A1 | 9/2020 | Daley et al. | |
| 2020/0297648 A1 | 9/2020 | Gauthier | |
| 2021/0187474 A1 | 6/2021 | Shaikh et al. | |

OTHER PUBLICATIONS

Indium Corporation, Chemical Vapor Deposition vs. Physical Vapor Deposition, 2012 (Year: 2012).*
Amazon, Just Scentsantional Pooh Stone, https./www.amazon.com/Just-Scentsational-PS-1-Natural-Training/dp/B005OB92YK accessed Aug. 24, 2021, cite reviews dated as early as 2017. (Year: 2017).

* cited by examiner

SEALABLE DEVICES TO CAUSE DEPOSITION OF VAPORS INTO SAMPLES

CROSS-REFERENCE TO RELATED APPLICATIONS

This application is a continuation of U.S. patent application Ser. No. 16/369,371 entitled "PRODUCING ODORANT PUMICE STONE SAMPLES," filed on Mar. 29, 2019, the contents of which are incorporated herein by reference.

STATEMENT OF GOVERNMENT INTEREST

The claimed subject matter was made by one or more employees of the United States Department of Homeland Security in the performance of official duties. The Government has certain rights in the invention.

FIELD OF THE INVENTION

The present invention relates generally to the field of producing odorants, and more specifically to the field of samples impregnated with odorants.

BACKGROUND OF THE INVENTION

Various porous or crystal materials are capable of retaining odors due to their absorbency and/or adsorbency. However, materials such as diatomaceous powder or phyllosilicates (vermiculite) can be difficult to work with, easily spilled, and cannot retain odors for much longer than several hours. Furthermore, vermiculite can be mined and subject to risk of contamination from other mined materials such as asbestos, posing a safety hazard. Such materials can build up static electricity charges, posing risks when used in conjunction with materials that can be triggered by static electricity discharges. Such materials in powdered form pose an inhalation health risk, particularly when used in powdered form, as well as a risk of cross-contamination of sites due to the difficulty of identifying and cleaning powder spills/contamination.

SUMMARY OF THE INVENTION

In an example embodiment, a device includes a vapor source chamber configured to contain a vapor source material to generate vapor. An activation chamber is configured to contain a sample. The activation chamber is in fluid communication with the vapor source chamber to receive the vapor. A permeable separator divides the vapor source chamber and the activation chamber, and isolates the sample in the activation chamber while allowing vapor to pass between the vapor source chamber and the activation chamber. The device is sealable and configured to apply vacuum to the vapor and sample, to cause deposition of the vapor into the sample.

In another example embodiment, a method includes sealing a device containing a sample and a vapor source material to prevent gases from entering into the device, while allowing gases to exit from the device; heating the device as function of a characteristic of the vapor source material to generate vapor in the device from the vapor source material; and maintaining the sealing of the device for a duration to cause deposition of the vapor into the sample.

In yet another example embodiment, a method includes heating a pumice stone (which, in other embodiments, can include pumicite) sample to remove contaminants from the pumice stone sample; sealing the pumice stone sample and an explosive vapor source material in a device; applying vacuum and heating to the device, to cause deposition of vapor molecules from the explosive vapor source materials into/onto the pumice stone in view of a porosity characteristic of the pumice stone sample, to generate an impregnated pumice stone sample; and packaging the impregnated pumice stone sample as a canine training aid for detection of the ingredients of the explosive vapor source material.

In another example embodiment, a composition of matter, intended for use in canine training, includes a natural volcanic rock substrate having vesicular structures and chemical vapor molecules, other than water vapor molecules, disposed in the vesicular structures.

Other features and aspects of the invention will become apparent from the following detailed description, which taken in conjunction with the accompanying drawings illustrate, by way of example, the features in accordance with embodiments of the invention. This summary is not intended to identify key or essential features of the claimed subject matter, nor is it intended to limit the scope of the invention, which is defined solely by the claims attached hereto.

BRIEF DESCRIPTION OF THE DRAWINGS

One or more example embodiments of the present invention are described in detail with reference to the following drawings. These drawings are provided to facilitate understanding of the present invention and should not be read as limiting the breadth, scope, or applicability thereof. For purposes of clarity and ease of illustration, these drawings are not necessarily made to scale.

FIG. 1 illustrates a device including a vapor source chamber and an activation chamber according to an example embodiment.

FIG. 2 illustrates a device including a vapor source chamber, an activation chamber, and a lid according to an example embodiment.

FIG. 3 illustrates a method of causing deposition of a vapor into a sample according to an example embodiment.

FIG. 4 illustrates a method of generating an impregnated pumice stone sample according to an example embodiment.

These drawings are not intended to be exhaustive or to limit the invention to the precise form(s) disclosed. It should be understood that the present invention can be practiced with modification and alteration, and that the invention is limited only by the claims and the equivalents thereof.

DETAILED DESCRIPTION OF THE INVENTION

FIG. 1 illustrates a device 110 including a vapor source chamber 112 and an activation chamber 114 according to an example embodiment. The vapor source chamber 112 is configured to contain a vapor source material 102 to generate vapor 103. The activation chamber 114 is configured to contain a sample 104. The activation chamber 114 is in fluid communication with the vapor source chamber 112 to receive the vapor 103. A permeable separator 116 divides the vapor source chamber 112 and the activation chamber 114, and isolates the sample 104 in the activation chamber 114 while allowing vapor 103 to pass between the vapor source chamber 112 and the activation chamber 114. The device 110 is sealable and configured to apply vacuum to the vapor 103 and sample 104, to cause deposition of the vapor 103 into the sample 104.

The vapor source chamber 112, separator 116, and activation chamber 114 can be made of metals such as aluminum, stainless steel, and the like, or other materials suitable for transferring or storing heat. In an example embodiment, the permeable separator 116 is a sheet formed of aluminum mesh, such as 1100 grade aluminum diamond mesh sheet. The separator 116 is configured to keep the sample 104 in the activation chamber 114, and prevents the sample 104 from falling into the vapor source chamber 112. The separator 116 also is permeable, to allow vapor 103 from the vapor source material 102 in the vapor source chamber 112 to pass into the activation chamber 114, to thoroughly permeate the device 110.

The device 110 is configured to receive the vapor source material 102. In an example, thin slices of a target material (e.g., artifact or liquid) serve as the vapor source material 102. The vapor source material 102 is laid on a clean tray and the tray is placed in the vapor source chamber 112. In an example, pumice stone(s) and/or pumicite serves as the sample 104, which is placed in the activation chamber 114. In other embodiments, the device 110 can be formed as a single vessel, to accommodate the sample 104 and the vapor source material 102 (e.g., by depositing the vapor source material 102 into and onto the sample 104). Characteristics of the vapor source material and/or the sample can be used to control the applied temperatures and/or pressures. For example, plastic military energetic materials can be used as the vapor source material 102, and the characteristics of the military energetic materials establish that the applied temperature is limited to an upper threshold of well over 50 degrees Celsius (C).

The sample 104 benefits from characteristics that enable it to retain odorants, such as its highly porous characteristic as a natural volcanic rock having a composition of primarily glass (silicic lavas, which contain desired properties described herein unlike some artificially created pumice stones). Chemical vapor molecules can be saturated into the sample 104 using a vacuum system, such as a vacuum coupling on the device 110, and/or the use of a vacuum oven 108. In an example embodiment, a pumice stone sample 104 has an average porosity of 90%. Microscales of the vesicular structures of the pumice stone provide a large surface area for highly volatile and semi-volatile chemical species from the vapor 103 of the vapor source material 102 to be retained. Thus, the average porosity and/or surface area characteristic(s) of the sample 104 can be used to establish rates, values, and/or durations for application of temperature and/or vacuum.

In an example embodiment, the sample 104 is prepped before use in the device 110. For example, a pumice stone sample 104 is preheated to 250 degrees C. for a 24-hour duration in the vacuum oven 108, and the sample 104 is allowed to cool in the vacuum oven 108, prior to subsequently sealing the pumice stone sample 104 in the device 110 for heating of the device 110 for vapor deposition. Such preheating/baking of the pumice removes contaminants, including water, from the pumice and improves vapor retention capability of the pumice.

The device 110, loaded with the vapor source material 102 and the sample 104, is then placed into the vacuum oven 108. In an embodiment, the device 110 includes a vacuum line that is routed out of the oven for connection to a vacuum pump (see, e.g., the vacuum orifice 220 in FIG. 2). The sample 104, inside the device 110, then absorbs the released vapor 103 from the vapor source material 102 exposed to vacuum and/or heat, without a need to use solvent. After heating, the cooling of the sample 104 also enables absorption of the vapor 103, inside the deep recesses of the sample 104. In other examples, a solvent-based approach is also used. However, by not needing to use solvent, the sample 104 can be impregnated with odorants that do not include the solvent, such that the impregnated sample 104 can be used as vapor emitting training material without exposing the sinus or olfactory to traces of the solvent, unlike solvent-based approaches that might risk mis-training the detection of a solvent instead of the target material.

In an example embodiment, the application and duration of heating and/or vacuum to the device 110 are adjusted as a function of characteristics of the vapor source material 102 and the sample 104. The application of heat/vacuum also is adjusted according to what level of saturation is desired for a given application, e.g., a desired intensity of odorant from the impregnated sample 104, and/or a longevity/shelf-life of the odorant from the impregnated sample 104. In an example embodiment, the vapor pressure characteristic of the vapor source material 102 is used to determine to what threshold temperature the device 110 is exposed. The temperature is increased at a predetermined rate to create the vapor 103, up to a predetermined temperature that is consistent with the vapor pressure of the vapor source material 102. In another example, a vacuum pump (not shown, coupled to the device 110) is activated to place the device 110 under vacuum in response to a temperature of the device 110 increasing to a threshold temperature. The vacuum pump is operated for a duration corresponding to achieving saturation of the sample 104 with the vapor, which can be determined empirically based on trial sampling of known samples and extrapolation based on adjusting for the particular characteristics of the vapor source material 102 and the sample 104 that are to be exposed to the vacuum for the duration. In an example embodiment, the vacuum applied ranges from 0 to 76 centimeters of mercury, where 0 represents atmospheric pressure.

Application of the sublimation and deposition process is based on the vapor molecules 103 of the vapor source materials 102 (e.g., contraband materials such as explosives, including RDX in military plastic explosives) imprinting or depositing into and onto the sample 104. For a pumice stone sample 104, a multi-scale pore morphology of the volcanic rock provides opportunities for the odor vapor molecules to be trapped inside the voids/pores of the pumice rock, as well as to be mechanically retained by the rough surface morphology of the pumice. To what degree a given vapor is trapped inside a pore vs. mechanically retained on surface morphology can be a function of the size and complexity of various vapor molecules.

The temperature of the device, e.g., by adjusting the vacuum oven 108, is increased gradually to create vapor molecules of the vapor source material 102. In an example embodiment, when the oven temperature starts to rise, the vacuum control should be activated for 2 to 4 hours. A bouquet of the vapor molecules thereby increase in the activation chamber 114 over time, and the chemical vapor molecules 103 are deposited into the samples 104.

In other embodiments, depending on the type of vapor 103 to be impregnated into the pumice sample 104, impregnation occurs with heat application at atmospheric temperature (no vacuum), or impregnation occurs with vacuum application at room temperature (no heat). Specific profiles of heat and/or vacuum application can be used for various combinations of samples 104 and vapor source materials 102.

After the sample 104 is sufficiently saturated (e.g., to a level appropriate for producing odorants at an intensity and/or longevity desired for the application, such as canine training) with the vapor molecules 103, the vacuum oven 108 (and/or the vacuum pump coupled directly to the device 110) are turned off. The device 110 cools down to room temperature, and the device 110 is unsealed to allow careful removal of the vapor impregnated sample 104.

In an example embodiment, the sample is a pumice stone, and the characteristic of the sample is average porosity, which is directly related to average surface area. The pores of the pumice are impregnated with the vapor molecules, and the pumice stone will test positive for the vapor for a duration on the order of a year(s), in stark contrast to powder-based odorants that typically retain odors on the order of mere hours.

Figure 2:
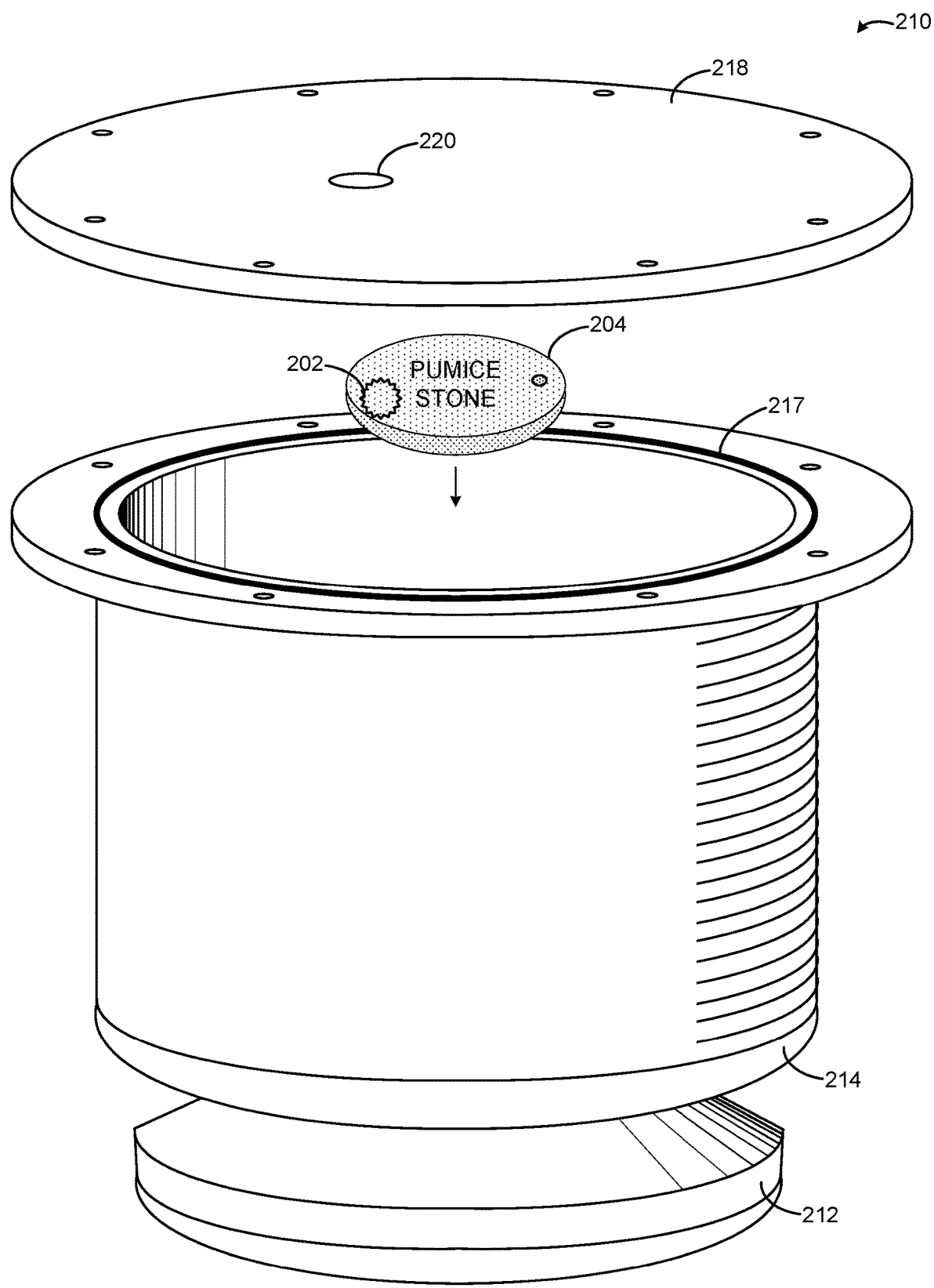

FIG. 2 illustrates a device 210 including a vapor source chamber 212, an activation chamber 214, and a sealable lid 218 according to an example embodiment. The lid 218 is removable and includes a vacuum line orifice 220. The device 210 serves as a dual-chambered sealable vessel, having a meshed hole between the vapor source chamber 212 and the activation chamber 214. An O-ring seal 217 provides an airtight seal for the lid 218. The device 210 can be loaded, sealed, coupled to a vacuum line, and placed in an oven for heating. In another example embodiment, the device 210 can remain uncoupled to a dedicated vacuum line, and can be subject to vacuum via a vacuum oven. A one-way relief valve can be coupled to the vacuum line orifice 220, to allow expanding heated gases to escape during heating, while retaining a vacuum as the device 210 cools.

The upper part of the vessel 210 is sufficiently large to allow vapor to surround the sample placed in the activation chamber 214. Vapor generation is enhanced by heat, which also enhances the vapor impregnation of the sample. The shape of the chambers 212, 214, and necking-down of the orifice between the chambers 212, 214, provide aerodynamic effects that create a flowing plume of the vapor as it rises with heating, upward from the vapor source chamber 212 into the activation chamber 214, ensuring that the vapor plume is aerodynamically influenced by the structural characteristics of the device 210 to achieve good dispersion of the generated vapor inside the device 210. Accordingly, even if the vapor source material is centrally placed in the vapor source chamber 212, the generated vapor will still be well dispersed throughout both chambers of the device 210.

The pumice stone sample 204 is illustrated in FIG. 2 as containing a trace 202 of the vapor source material already deposited onto the sample 204. More specifically, in the illustrated embodiment, prior to sealing the device 210, a solution of the vapor source material is prepared, e.g., by dissolving a target in a solvent. The solution of the vapor source material is then deposited onto the sample 204 as a trace 202. The solvent of the trace 202 is then evaporated from the sample 204, to leave a residue/trace 202. In an example, evaporating the solvent from the sample 204 prior to generating vapor in the device 210, involves heating the sample 204 with the deposited solution 202 in a vacuum oven prior to sealing the sample 204 in the device 210.

In an example embodiment, a solution is prepared by dissolving a target material in a solvent, which is applied to the pumice stone sample 204. The sample 204 is then heated to ensure the solvent has evaporated, and then the sample is sealed into the device 210 which is then exposed to vacuum/heating, and then cooling, to fully impregnate the target vapor inside the pumice stone device 210. Thus, the approaches described herein enable difficult vapor source materials to be used effectively. More specifically, the target material is an example of a difficult explosive to work with and use for training canines because, being a primary explosive, it can be detonated by heat, shock, or friction. However, the vapor-impregnated sample described herein can be safely and easily handled by operators or canines, and provides useful stability and longevity. Examples described herein are not limited to applications relating to security or explosives detection (such as canine training materials easily carried by decoy passengers to train canines to alert in real-world training environments), and also extend to non-security applications relating to health and beauty (skin callous removal), cleaning (removing stains from porcelain), or other applications where a scented pumice stone can be used for olfactory recognition of a generated vapor.

Figure 3:
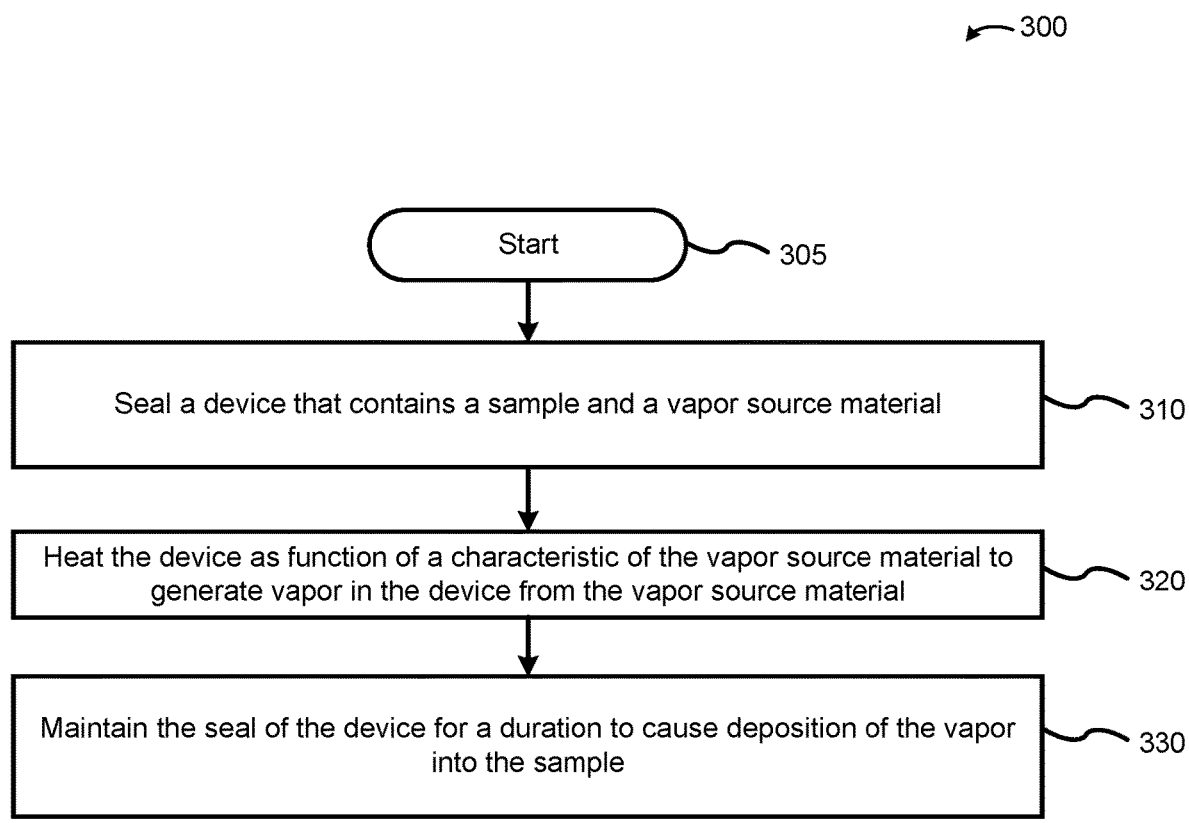

FIG. 3 illustrates a method 300 of causing deposition of a vapor into a sample according to an example embodiment. In block 310, a device that contains a sample and a vapor source material is sealed. For example, the device has a removable lid, which is fastened to the device and provides an airtight seal using an O-ring. In block 320, the device is heated as function of a characteristic of the vapor source material to generate vapor in the device from the vapor source material. For example, a vapor source material having a low vapor pressure effectively produces sufficient vapor molecules at a lower temperature, compared to a vapor source material having a relatively higher vapor pressure. In block 330, the seal of the device is maintained for a duration to cause deposition of the vapor into the sample. For example, the device is held at a target temperature for a duration of 2-4 hours, and then allowed to cool to room temperature before being unsealed to remove the impregnated sample. The target temperature, and duration of heating, cooling, and/or storing prior to unsealing, can be established in view of various characteristics, such as how readily the sample will accept vapor molecules (e.g., porosity of the pumice stone), and/or how readily the vapor source material will generate vapor molecules (e.g., a vapor pressure of one, several, or all of the constituent ingredients of the vapor source material). In an alternate example embodiment, a characteristic of the sample is used to determine a temperature and/or pressure for impregnation of the sample. For example, a pumice stone having average porosity of 80% is held at the target temperature for a longer duration of vapor deposition, compared to a pumice stone having an average porosity of 90%. In an embodiment, conditions are adjusted to enable vapors of substantially all of the different ingredients of a vapor source material to be deposited in the sample. Accordingly, the sample will retain an "image" of the vapor source material, such that the sample emits its own vapor profile that is substantially identical to that of the vapor source material, minimizing any risk of mis-training a canine in detection of such specific combinations and ratios of vapor molecules emitted by the sample mirroring the vapor source material.

Figure 4:
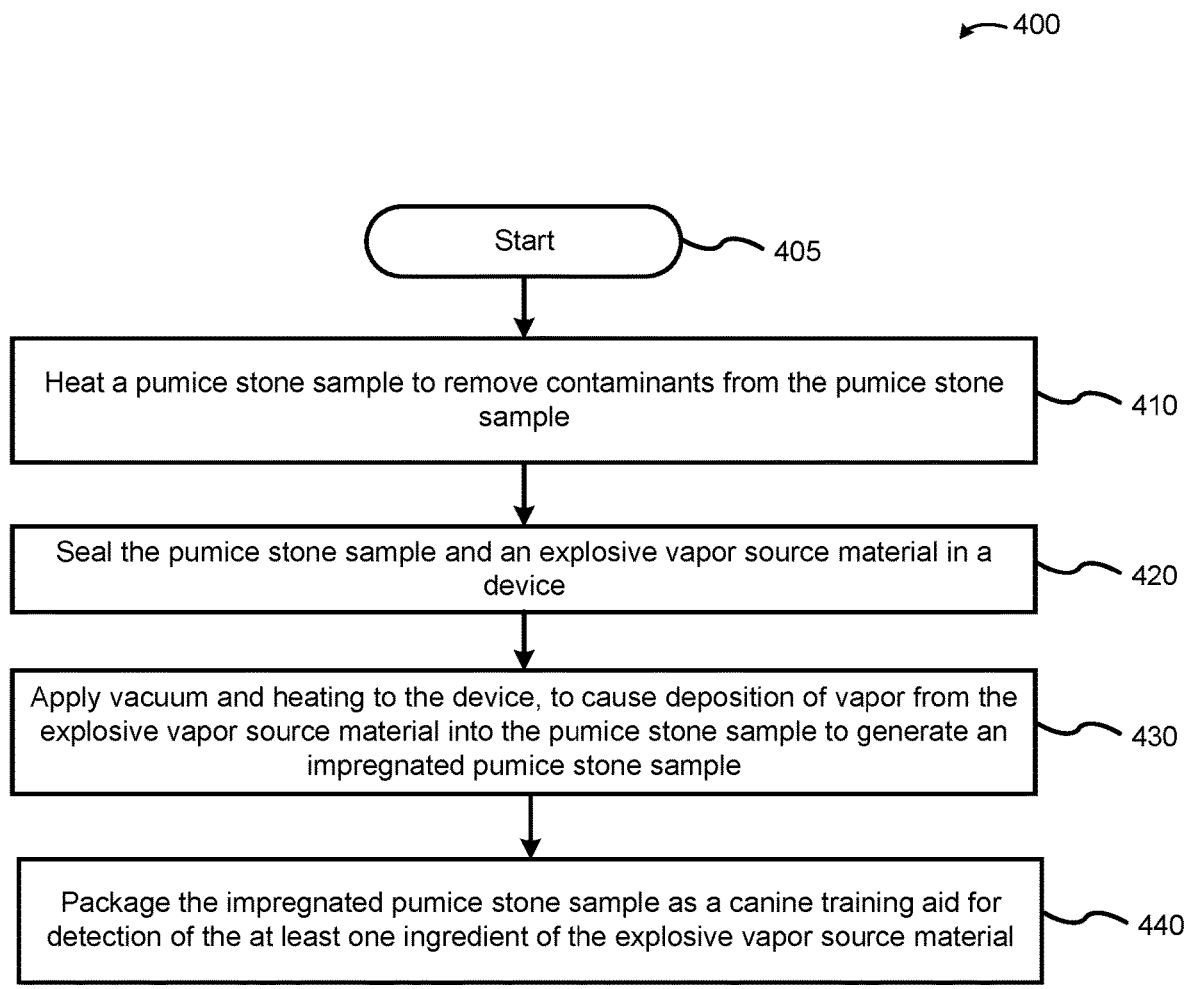

FIG. 4 illustrates a method 400 of generating an impregnated pumice stone sample according to an example embodiment. In block 410, a pumice stone sample is heated to remove contaminants from the pumice stone sample. For example, a 90% porosity pumice stone is heated to a target temperature above the boiling point of water, and held at the target temperature for 24 hours. In block 420, the pumice stone sample and an explosive vapor source material are sealed in a device. For example, the device provides a single chamber, in which the pumice stone, doped with a trace of explosive solution (whose solvent has previously been evaporated off), is placed and sealed. In block 430, vacuum and heating are applied to the device, to cause deposition of vapor from the explosive vapor source material into the pumice stone sample, to generate an impregnated pumice stone sample. In an example embodiment, vacuum and heating are applied to the device in view of a porosity characteristic of the pumice stone sample.

In block 440, the impregnated pumice stone sample is packaged as an object for olfactory detection of the ingredients of the vapor source material. For example, the chemical vapor deposited pumice is individually stored in a permeable bag of Tyvek material having dimensions of 3.5 inches wide by 6 inches long. The permeable bag is heat-sealed to retain the pumice stone. A final bagging process is then applied to the permeable bag, by sealing the permeable bag in an impermeable aluminum bag, to prevent escape of vapor molecules from the impregnated pumice stone through the permeable bag. The aluminum bag is heat-sealed with a band heat sealer. Once the final product is heat-sealed in the aluminum bag, the product can be stored at room temperature for over a year, while still remaining serviceable and capable of emitting vapors sufficient for human or canine olfactory detection.

A pumice stone, in addition to providing vapor retention properties, provides sufficient structure and rigidity. Pumice can be carved into specific shapes suitable for decoy placement, e.g., inside of a decoy laptop computer. Pumice can be used as a training material inside a permeable bag, and also can be used as a bare stone, e.g., by placing the stone in a hiding location for an olfactory sense to locate. The bare pumice enables the use of vapor molecules that are emitted from the pumice in detectable amounts sufficient for training, even if the particular vapor molecules are from a particular training material or explosive having a vapor pressure that is otherwise insufficient to permeate a permeable bag (which prevents the use of such training materials when provided in an unwieldy powdered form that needs to be kept in a permeable bag to avoid cross-contamination). Accordingly, the embodiments described herein enable previously unavailable training materials to be used effectively, while avoiding contamination of training environments.

While a number of example embodiments of the present invention have been described, it should be appreciated that the present invention provides many applicable inventive concepts that can be embodied in a wide variety of ways. The example embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure and the knowledge of one of ordinary skill in the art.

Terms and phrases used in this document, unless otherwise expressly stated, should be construed as open ended as opposed to closed—e.g., the term "including" should be read as meaning "including, without limitation" or the like; the term "example" is used to provide example instances of the item in discussion, not an exhaustive or limiting list thereof; the terms "a" or should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Furthermore, the presence of broadening words and phrases such as "one or more," "at least," "but not limited to," or other similar phrases, should not be read to mean that the narrower case is intended or required in instances where such broadening phrases may be absent. Any headers used are for convenience and should not be taken as limiting or restricting. Additionally, where this document refers to technologies that would be apparent or known to one of ordinary skill in the art, such technologies encompass those apparent or known to the skilled artisan now or at any time in the future.

What is claimed is:

1. A device comprising:
a vapor source chamber configured to contain a vapor source material to generate vapor;
an activation chamber configured to contain a sample and in fluid communication with the vapor source chamber to receive the vapor; and
a permeable separator disposed between the vapor source chamber and the activation chamber, configured to isolate the sample in the activation chamber and allow passage of vapor between the vapor source chamber and the activation chamber;
wherein the device is sealable and configured to apply vacuum to the vapor and sample, to cause deposition of the vapor into the sample.

2. The device of claim 1, wherein the device includes an orifice configured to be coupled to a vacuum pump that places the device under vacuum in response to temperature of the device increasing to a threshold temperature.

3. The device of claim 1, wherein the permeable separator is a sheet formed of aluminum mesh.

4. The device of claim 3, wherein the permeable separator is 1100 grade aluminum diamond mesh sheet.

5. The device of claim 1, wherein the vapor source material is an explosive.

6. The device of claim 1, further comprising a vacuum line orifice formed in a lid that seals the device.

7. The device of claim 6, further comprising a one-way relief valve coupled to the vacuum line orifice to prevent gases from entering into, while allowing the gases to exit from, the device.

8. The device of claim 6, further comprising a vacuum line coupled to the vacuum line orifice.

9. The device of claim 1, wherein the vapor source chamber includes a tapered section leading to the activation chamber.

10. The device of claim 1, wherein the vapor source chamber, the permeable separator, and the activation chamber are made of aluminum.

11. The device of claim 1, wherein the vapor source chamber, the permeable separator, and the activation chamber are made of stainless steel.

12. The device of claim 1, further comprising an o-ring seal and a removable lid to seal the device.

13. A composition of matter, comprising:
a natural volcanic rock substrate having vesicular structures; and
chemical vapor molecules, other than water vapor molecules, disposed in the vesicular structures;
wherein the chemical vapor molecules are of a vapor source material selected from the set comprising explosives including RDX.

14. The composition of matter as set forth in claim 13, further comprising a permeable bag that is heat sealed to package the natural volcanic rock substrate for use as a training aid.

15. The composition of matter as set forth in claim 14, further comprising an impermeable aluminum bag that is heat sealed to store the permeable bag containing the natural volcanic rock substrate.

\* \* \* \* \*